United States Patent [19]

Harris et al.

[11] 4,256,281
[45] Mar. 17, 1981

[54] CUP HOLDING APPARATUS

[75] Inventors: Linda D. Harris, Detroit; Frank J. Paretti, Roseville; Sharon L. McWhorter, Highland Park, all of Mich.

[73] Assignee: Galactic Concepts & Designs, Inc., Highland Park, Mich.

[21] Appl. No.: 900,346

[22] Filed: Apr. 27, 1978

[51] Int. Cl.³ .................... A47B 96/06; A47K 1/08
[52] U.S. Cl. .................... 248/231; 248/311.2; 248/315
[58] Field of Search ............ 248/230, 231, 311.1 R, 248/311.1 A, 312, 315

[56] References Cited

U.S. PATENT DOCUMENTS

| | | | |
|---|---|---|---|
| 809,896 | 1/1906 | Bender | 248/315 X |
| 1,045,932 | 12/1912 | Beckworth | 248/315 X |
| 1,116,265 | 11/1914 | Graham | 248/315 X |
| 3,118,645 | 1/1964 | Lewis et al. | 248/312 |
| 3,532,318 | 10/1970 | Lloyd | 248/311.1 |
| 3,698,675 | 10/1972 | Lerew et al. | 248/311.1 |
| 4,071,175 | 1/1978 | Wagnon | 248/15 X |
| 4,088,250 | 5/1978 | Schaefer | 248/315 |

FOREIGN PATENT DOCUMENTS

| | | | |
|---|---|---|---|
| 1343400 | 10/1963 | France | 248/231 |
| 372125 | 6/1939 | Italy | 248/311.1 |
| 244743 | 5/1947 | Switzerland | 248/315 |
| 402252 | 11/1933 | United Kingdom | 248/312 |
| 476616 | 12/1937 | United Kingdom | 248/311.1 |

*Primary Examiner*—Lawrence J. Staab
*Attorney, Agent, or Firm*—Harness, Dickey & Pierce

[57] ABSTRACT

There is disclosed herein a cup holder assembly particularly adapted to be secured to a variety of supporting surfaces which cup holder assembly is uniquely designed to support cups having downwardly converging side walls such as for example conventional paper cups or the like. The cup holder assembly includes a cup holding member having a generally circular opening provided therein which is designed to receive a portion of the cup in a manner so as to supportingly engage the side walls thereof. The cup holding member is designed to be supported upon a variety of adjacent surfaces by means of a mounting assembly. In one form the mounting assembly includes a support member adapted to removably receive and support the cup holding member in cantilevered relationship thereto and which support member is particularly suited to be secured to a generally cylindrical member such as the handle bars of a bicycle or the like by means of a strap clamp. Additionally, an angled member may be provided which can be inserted in the window slot of a motor vehicle and to which the support member may be removably attached so as to support the cup holding member from such portion of a motor vehicle or the like should this be desired. In another embodiment, the mounting assembly comprises a clamp member having a portion for clampingly engaging a surface from which the cup holding member is to be supported and another portion to which the cup holding member may be removably secured. In still another embodiment the mounting assembly may be fixedly attached to the cup holding member by suitable fasteners.

7 Claims, 15 Drawing Figures

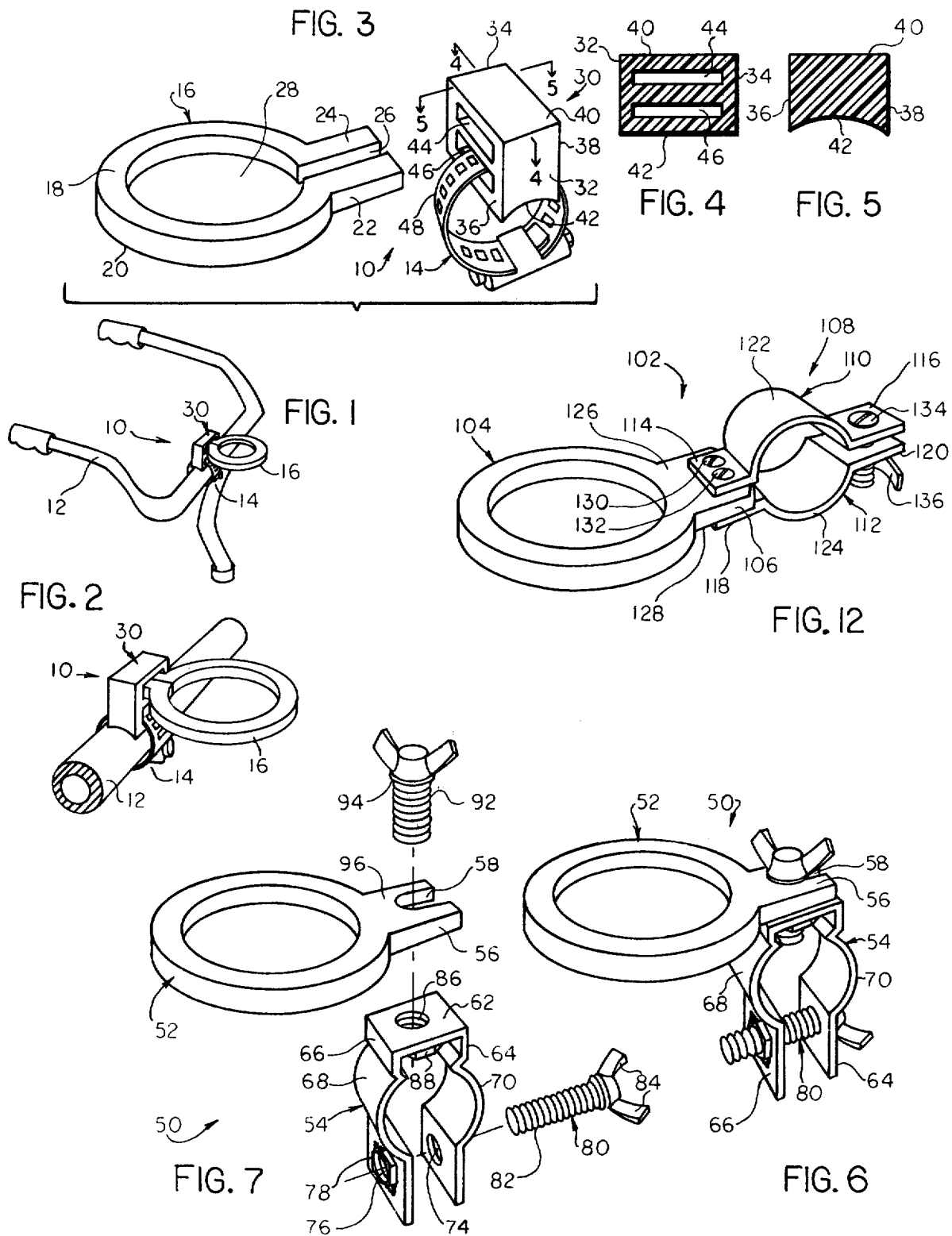

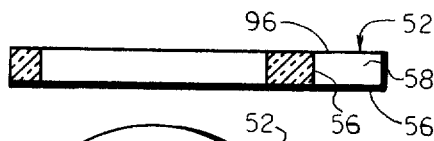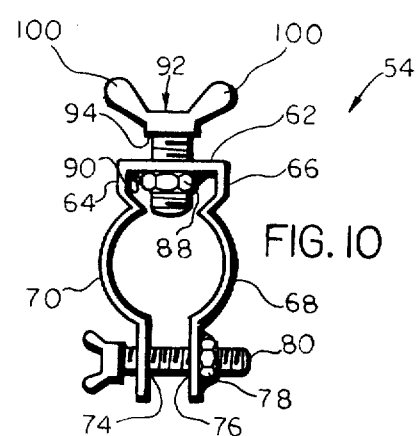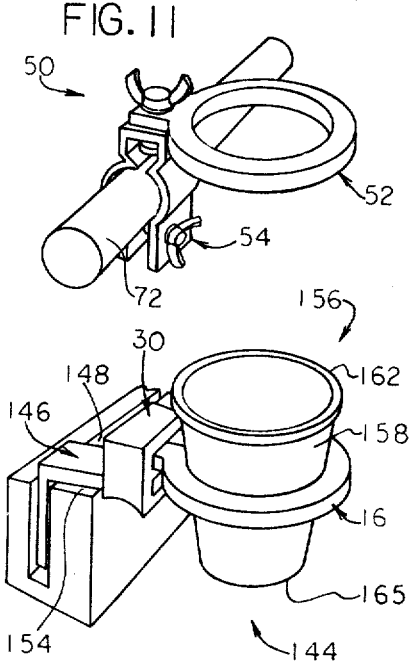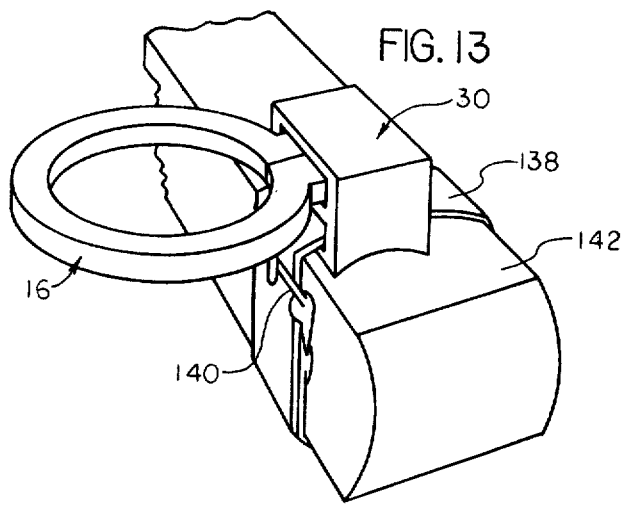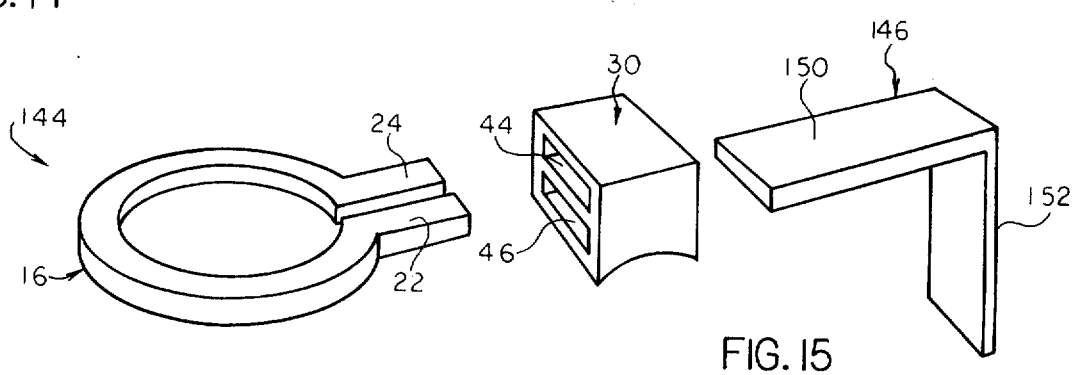

4,256,281

CUP HOLDING APPARATUS

BACKGROUND AND SUMMARY OF THE INVENTION

The present invention relates generally to cup holding devices and more specifically to such devices which are adapted to be removably secured to a variety of supporting surfaces without requiring separate fasteners or the like.

In many situations it is desirable to provide apparatus for holding a drinking cup which can be attached to an adjacent structure such as for example an arm of a chair, a bicycle or motorcycle or even a portion of a motor vehicle. Generally, such devices must provide both horizontal support to the drinking cup or container as well as lateral support so as to inhibit accidental tipping of the cup and/or spilling of the contents. Accordingly, various types of devices have been developed to answer these needs. However, most of the cup holders, as are presently available, require mounting devices be secured permanently to the supporting surface. In many applications this may be undesirable or even impossible to accomplish. Further, these cup holders may be relatively expensive to manufacture in that their designs provide intricate basket portions for supporting the container. Also, these basket arrangements can make removal of the cup from the holder a difficult task particularly when the cup being used is relatively short so as to have the top thereof rest below the top surface of the basket.

Accordingly, the present invention provides a cup holder having an extremely simple design which is suitable for supporting a variety of different sized containers and which may be easily fabricated at very low cost. Further, the present invention is uniquely adapted to be secured to various supporting surfaces having a wide variety of cross-sectional contours without requiring the use of any adhesives or fasteners which may mar or otherwise require defacing of the desired supporting surface. For example, in one form the present invention is uniquely adapted for mounting on the handle bars of a bicycle or any other generally cylindrically shaped member. In another embodiment a flexible strap may be employed to enable the device to be secured to supporting means having larger cross-sectional surfaces such as the arm of a lawn chair or the like. Also, in yet another form, an L-shaped bracket may be provided which enables the holder to be cantilevered from the window slot of an automobile or the like. Additionally, in several of the embodiments the cup holding member may be easily removed from the support member when not in use so as to prevent it from interfering with other activities.

Additional advantages and features of the present invention will become apparent from the following description of the preferred embodiments taken in conjunction with the accompanying drawings and the claims appended hereto.

BRIEF DESCRIPTION OF THE DRAWINGS

FIG. 1 is a perspective view of a preferred embodiment of the present invention shown in installed relationship to the handle bars of a bicycle, motorcycle or the like;

FIG. 2 is an enlarged perspective view of the embodiment of the present invention illustrated in FIG. 1;

FIG. 3 is an enlarged exploded perspective view of the embodiment of the present invention illustrated in FIGS. 1 and 2 showing the cup holding member removed from the mounting assembly;

FIG. 4 is a longitudinal sectional view of the support member illustrated in FIG. 3, the section being taken along line 4—4 thereof;

FIG. 5 is a transverse sectional view of the support member illustrated in FIG. 3, the section being taken along line 5—5 thereof;

FIG. 6 is a perspective view of another embodiment of the present invention;

FIG. 7 is an exploded perspective view of the embodiment illustrated in FIG. 6;

FIG. 8 is a plan view of the cup holding member of the present invention;

FIG. 9 is a sectional view of the cup holder illustrated in FIG. 8, the section being taken along line 9—9 thereof;

FIG. 10 is a side elevational view of the mounting apparatus illustrated in FIGS. 6 and 7;

FIG. 11 is a perspective view of the embodiment illustrated in FIGS. 6 and 7 shown in installed operative relationship to an elongated cylindrical member;

FIG. 12 is a perspective view of yet another embodiment of the present invention;

FIG. 13 is an enlarged perspective view of another embodiment of the present invention shown in installed operative relationship to an arm of a chair or the like;

FIG. 14 is a perspective view of yet another embodiment of the present invention; and FIG. 15 is an exploded perspective view of the embodiment of FIG. 14;

DESCRIPTION OF THE PREFERRED EMBODIMENTS

Referring now to the drawings and in particular to FIGS. 1-5, there is illustrated therein a cup holder assembly in accordance with the present invention being indicated generally at 10. As seen with reference to FIG. 1, cup holder assembly 10 is designed to be securely mounted to a portion of the handle bars 12 of a bicycle, motorcycle, or the like through the agency of a conventional strap clamp 14. As shown, the cup holding device comprises a cup holding member 16 of generally circular shape having relatively flat substantially parallel upper and lower surfaces 18 and 20 and of generous thickness. A tab portion in the form of a pair of substantially identical parallel leg members 22 and 24 extends radially outwardly, leg members 22 and 24 being spaced slightly so as to define a slit 26 opening into a centrally disposed generally circular opening 28 provided therein.

A support member 30 is also provided comprising a generally right angle parallelepiped shaped member defined by substantially parallel spaced end walls 32, 34, substantially parallel spaced side walls 36, 38, a generally flat top wall 40, and a concave bottom wall 42. A pair of spaced substantially parallel generally rectangularly shaped slots 44 and 46 extend through support member 30 opening outward through side walls 36 and 38. Bottom wall 42 is concave in shape so as to provide a greater surface area of engagement with handle bars 12 thereby aiding in preventing relatively rotation therebetween.

Slot 44 is adapted to receive leg members 22 and 24 and has a minor dimension substantially equal to or only slightly less than the thickness of cup holding member 16 and a major dimension approximately equal to or slightly greater than the sum of the widths of leg members 22 and 24. Thus, leg portions must be squeezed laterally together to enable them to be inserted within slot 44 and thereafter will exert a slight outward pressure against the interior of slot 44 so as to thereby provide a frictional retention force.

Slot 46 is of a suitable size to accommodate the strap portion 48 of strap clamp 14 which also will encircle the member to which support member 30 is to be secured so as to clamp surface 42 in engaging relationship with a corresponding supporting surface portion such as handle bar 12. Preferably, both cup holding member 16 and support member 30 will be fabricated from a suitable plastic composition although other materials may also be used. In a preferred embodiment it may be desirable to fabricate the cup holding member from a transparent plastic material or an appropriately colored material coordinated with the article to which it is to be secured should this be desirable.

It should also be noted that slots 44 and 46 are of substantially identical size, support member 30 may be inverted so as to place surface 40 in engaging relationship with an adjacent supporting surface with strap portion extending through slot 44 and legs 22 and 24 being received in slot 46. Alternatively, slot 46 may be substantially small than slot 44 so as to reduce the overall size of support member 30 if desired.

Referring now to FIGS. 6 through 11, there is illustrated another embodiment of the present invention indicated generally at 50 and comprising a cup holding member 52 similar to the cup holding member 16 described with reference to FIGS. 1 through 5 and a mounting assembly 54. However, in this embodiment cup holding member 52 is provided with a radially outwardly extending tab portion 56 having an outwardly opening radially inwardly extending slot 58 provided therein having a generally arcuate shaped inner end portion 60.

Mounting apparatus 54 is generally U-shaped having a substantially flat upper surface 62 and a pair of generally parallel irregularly shaped depending spaced leg portions 64 and 66. Each of these leg members are provided with arcuate opposed outwardly bulging central portions 68 and 70 respectively so as to enable it to accommodate the generally circular surface of a cylindrical member 72, such as for example the handle bars of a bicycle or motorcycle. The lower end portion of leg member 64 is provided with an opening 74 adapted to accommodate a suitable threaded fastener 80. The lower end portion of leg member 68 is similarly provided with an opening 76 and has a nut 78 secured thereto such as by welding or in any other suitable manner. As shown, threaded fastener 80 preferably includes a threaded portion 82 and suitable means for enabling hand tightening such as wings 84 at one end thereof. Upper flat surface 62 also has a centrally disposed opening 86 provided therein and a nut 88 secured to the lower surface 90 thereof in a suitable manner such as by welding.

In order to secure mounting apparatus 54 to a supporting surface such as cylindrical member 72 or the like, mounting apparatus 54 is first slipped over cylindrical member 72 so as to position the cylindrical member between outwardly bulging portions 68 and 70 of depending leg members 64 and 66. Thereafter, threaded fastener 80 is inserted through opening 74 provided in leg portion 64 and into threaded engagement with nut 78 secured to the outer surface of leg 66. By rotating this threaded member, legs 64 and 66 will be drawn towards each other thereby clamping cylindrical member 72 therebetween. Next, in order to secure cup holding member 52 to mounting apparatus 54 another threaded fastener 92 is inserted in threaded engagement with nut 88 through opening 86 provided in upper flat surface 62. Slot 58 provided in radially outwardly extending tab portion 56 is then slid into engagement therewith. Thereafter, threaded fastener 92 may be tightened down so as to bring an annular collar portion 94 provided thereon into clamping engagement with the upper surface 96 of tab portion 56 so as to clamp tab portion 56 between annular collar portion 94 and surface 62. Threaded fastener 92 is also provided with suitable means to enable hand tightening thereof such as for example oppositely extending wings 100.

Yet another embodiment of the present invention is illustrated at 102 and will be described with reference to FIG. 12. In this embodiment a cup holding member 104 having a generally similar shape to that described above with reference to cup holding members 16 and 52 is provided. However, in this embodiment, tab portion 106 is not provided with a slot or a slit but rather has a pair of spaced openings extending therethrough. A mounting apparatus 108 is provided comprising upper and lower members 110 and 112 having substantially identical shapes each including oppositely extending flange portions 114, 116, 118, and 120 and central body portions 122 and 124 having generally arcuate outwardly extending shapes are provided. Flange portions 114 and 118 are disposed in engaging relationship with upper and lower surfaces 126 and 128 of tab portion 106 and secured thereto by means of suitable fasteners such as screws 130 and 132 extending therethrough. Flange portions 116 and 120 are provided with openings extending therethrough in which is disposed a suitable threaded fastener such as screw 134 and wing nut 136 which operate to draw flange portions 116 and 120 together. Central body portions 122 and 124 of the mounting apparatus 108 are provided with outwardly bulging sections so as to define a generally cylindrical shaped bore extending therethrough which enables the cup holding device to be secured to any suitable cylindrically shaped member.

It should be noted, however, that while the embodiments of FIGS. 7 through 11 and 12 are each illustrated and have been described with reference to clamping members having configurations suitable for attaching the present invention to cylindrically shaped members, should it be desirable these contours may be altered to enable the clamp members to be secured to other supporting surfaces having a variety of cross-sectional shapes such as for example hexagonal, octagonal, etc.

Referring now to FIG. 13, should it be desirable to attach the cup holding device of the present invention to a supporting surface having a cross-sectional size too large to be accommodated by the clamping arrangements discussed above, suitable strap 138 may be employed such as is illustrated in FIG. 13. In this embodiment a support member and cup holding device identical to those illustrated and described with reference to FIGS. 1 through 5 may be employed in conjunction with an elongated strap 138 having a suitable fastening device 140 provided thereon which strap may be threaded around the structure 142 to which the cup holding device is to be secured so as to retain the support member in fixed relationship therewith. This embodiment may be particularly well suited for use in securing the support member of the present invention to an arm of a chair or the like.

Referring now to FIGS. 14 and 15, there is illustrated yet another embodiment of the present invention indicated generally at 144 which is adapted for use in supporting a cup in cantilevered relationship from a window slot of a motor vehicle. In this embodiment a cup holding member and support member substantially identical to those described above with reference to FIGS. 1 through 5 are employed and therefore same numbers are employed to indicate corresponding portions thereof. A bracket member 146 is also provided for attaching the support member 30 to a window slot 148. Bracket member 146 comprises first and second leg portions 150 and 152 of substantially the same length which are disposed at substantially right angles relative to each other. Thus, in order to install cup holding device 144, leg portion 152 is merely inserted into window opening 148 with the upper leg extending over the window ledge 154 into the interior of the vehicle. Leg portion 150 must be of sufficient length so as to extend beyond window ledge 154 a sufficient distance to enable support member 30 to be attached thereto by slipping leg portion 150 into slot 46 thereof. Leg portions 22 and 24 of cup holding member 16 may thereafter be slipped into slot 44 provided in the support member and will be frictionally retained therein in the same manner as described above.

As illustrated in FIG. 14, each of the cup holding devices of the present invention are designed primarily to support a cup 156 having upwardly diverging side walls 158 such as for example conventional paper cups used in dispensing various soft drinks or the like. Such cups will generally have a bottom portion 160 having a first diameter and a top 162 having a diameter substantially larger than the diameter of bottom portion 160. Thus, the opening provided in the cup holding member will preferably be of a diameter greater than the bottom diameter but less than the diameter of the top portion of the cup so as to enable the side wall portions defining the opening provided in the cup holding member to engage side walls 158 of the drinking cup thereby supporting the cup therein. As the relative diameter differences between the top and bottom of such cups vary considerably, a suitably sized opening may be provided which will be able to accommodate a large variety of cup sizes. Additionally, it should be noted that each of the cup holding members of the present invention with the exception of the embodiment illustrated in FIG. 12 is adapted to be easily removed from the mounting apparatus and stored during periods of non-use. This enables an individual employing the present invention to eliminate the possibility of interference with the cup holding device of the present invention during normal operation or utilization of the structure to which it is attached. Further, it should be noted that the attaching devices provided herein do not require the drilling of any holes or attaching any other permanent securing means to the supporting surface to which the cup holder is to be attached thus eliminating the necessity of altering or mutilating in any way such surfaces. This is particularly desirable such as in the case of bicycle or motorcycle handle bars where the drilling of any holes therein may weaken the structure. Further, in many other applications, it is undesirable or impossible to provide such openings.

Thus, the present invention provides an extremely simple means for supporting a drinking container upon a variety of surfaces without requiring any special alteration of such surfaces to accommodate same. The present invention may be easily fabricated with relatively few components and further is very easily installed in only a few minutes without requiring any special tools or the like. It should also be noted that a single cup holding member may be provided with a variety of mounting apparatus so as to enable the same cup holding member to be used in numerous applications.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A cup holder comprising:
   a cup holding member having an opening therein adapted to receive said cup, said cup being supported within said member by mutual engagement of edges defining said opening and portions of said cup;
   a tab portion integrally formed on said cup holding member and projecting outwardly therefrom in a radial plane lying perpendicular to the longitudinal axis of said cup, said tab portion including a slit extending radially outwardly from said opening through said tab portion to the outer end thereof;
   mounting means adapted to be attached to a supporting structure, said mounting means including first and second generally rectangular slots positioned in substantially parallel spaced planes, one of said slots directly receiving said tab portion so as to support said cup holding member in cantilevered relationship thereto; and
   attaching means for removably supportingly attaching said mounting means to said supporting structure, said attaching means including a portion received within the other of said first and second slots and another portion at least partially surrounding said supporting structure so as to removably supportingly attach said mounting means to said supporting structure without requiring alteration of said supporting structure.

2. A cup holder as set forth in claim 1 wherein said mounting means includes a support member engageable with said supporting structure and, said first opening comprises a slot for receiving said tab portion.

3. A cup holder as set forth in claim 2 wherein said attaching means comprises a strap clamp extending through said second opening and engaging a portion of said support member and adapted to surround a portion of said supporting structure.

4. A cup holder as set forth in claim 3 wherein said support member includes a concave surface adapted to engage said supporting structure.

5. A cup holder as set forth in claim 1 wherein said tab portion is frictionally retained in said slot.

6. A cup holder as set forth in claim 1 wherein said cup holding member is generally circular in shape, said tab portion projecting radially outward therefrom and said opening is circular and of a diameter less than the maximum diameter and greater than the minimum diameter of a cup to be supported therein.

7. A cup holder as set forth in claim 6 wherein said cup holding member is fabricated from plastic.

* * * * *